United States Patent [19]
Behnke

[11] Patent Number: 5,237,689
[45] Date of Patent: Aug. 17, 1993

[54] CONFIGURATION OF MASS STORAGE DEVICES

[75] Inventor: Eric Behnke, Mountain View, Calif.

[73] Assignee: Hewlett-Packard Company, Palo Alto, Calif.

[21] Appl. No.: 530,848

[22] Filed: May 31, 1990

[51] Int. Cl.⁵ .......................................... G06F 13/00
[52] U.S. Cl. ................................. 395/700; 395/425; 364/DIG. 2; 364/948.21; 364/927.63; 364/928; 364/964.3; 364/952.1
[58] Field of Search ................. 364/DIG. 2, DIG. 1; 395/700, 425

[56] References Cited

U.S. PATENT DOCUMENTS 4,787,060 11/1988 Boudreau et al. ............. 364/DIG. 1
5,119,486 6/1992 Albonesi ..................... 364/DIG. 1

OTHER PUBLICATIONS

COMPAQ Corporation, *Eisa Configuration Utility*, Screen listings 1-4. Date Not Available.

ALR Corporation, *EISA CONFIGURATION UTILITY*, Screen listings 1-3. Date Not Available.

*Primary Examiner*—Thomas M. Heckler
*Attorney, Agent, or Firm*—Roland I. Griffin; Alan H. Haggard

[57] ABSTRACT

A system and method is disclosed for a personal computer (PC) to auto-detect the configuration of mass storage devices installed by the user. At least one drive table contains numerous configurations pertaining to industry-standard mass storage devices. These numerous configurations are compared to the configuration which is auto-detected. If a match occurs, then the PC adopts that configuration. However, the PC permits the user to override this configuration by entering a custom configuration or by selecting another configuration from the drive table(s). If no match occurs, then the user is permitted to select one of numerous generic configurations pertaining to mass storage devices. Accordingly, the PC system configuration if used on a different PC will function properly if the selected generic configuration matches a configuration found in the BIOS program of the different PC.

14 Claims, 10 Drawing Sheets

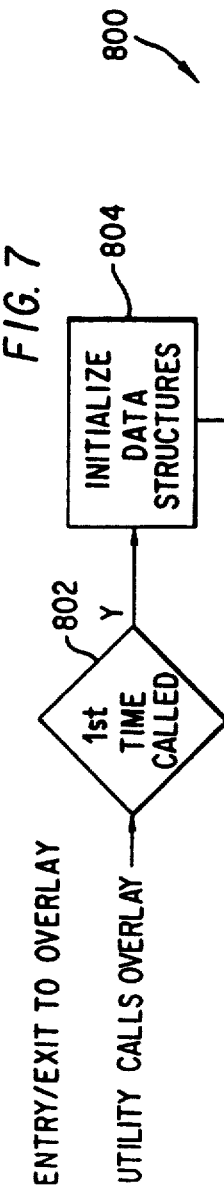
FIG. 7
FIG. 8

CONFIGURATION OF MASS STORAGE DEVICES

BACKGROUND OF THE INVENTION

I. Field of the Invention

The present invention relates to a computer system, and more particularly, to a system in a personal computer (PC) for providing to the PC the configuration (CFG) of a mass storage device. II. Related Art As the PC industry has evolved, it has become necessary to more readily manipulate large quantities of data in PCs, which have been progressively used more for compute-intensive applications. These applications include, for example, high resolution graphics displays, high performance computer automated design (CAD) workstations, high speed local area networks (LAN), and recently the new Extended Industry Standard Architecture (EISA) peripherals which are being developed to handle 32-bit burst data transfers at up to 33 megabytes per second.

A variety of mass storage peripherals have been developed to meet the needs of the PC industry. Mass storage peripherals include for example flexible (floppy) disks, hard disks, and tape drives. One of the most commonly used mass storage peripherals is the hard disk. The hard disk is a preferred device because of its non-volatile storage space and its high storage capacity.

The intense development effort in the PC industry has provided faster hard disks with higher and higher data storage capacities. As a result, many different types of hard disks exist in the marketplace with many different operating characteristics, or "configurations."

In order for a mass storage peripheral, such as a hard disk, to be used in a PC, the PC must know the configuration information regarding the peripheral in order to interact with and properly access it. More specifically, peripheral devices are usually controlled by a local hardware device known as a controller. Upon receipt of signals from the central processing unit, or in this case a microprocessor, the controller performs the data transfers between the peripheral and the microprocessor. These controllers must be aware of the specific configuration in order to generate proper control signals for the peripheral. Furthermore, the central processing unit (CPU) and the Basic Input Output System (BIOS) of the PC must know the peripheral configuration to properly allocate resources and interact with the peripheral.

With regard to hard disks, a de facto industry standard has developed in the PC industry to deal with identifying the many varieties. The configuration of most conventional hard disks can be described with a "type." A type comprises 16 bytes of information that describes the configuration of the hard disk.

Traditionally, when a hard disk is installed in a PC, the user is required to manually enter the "type" corresponding to the hard disk into the PC keyboard in order to apprise the PC of the configuration. This process results in system malfunctions due to human error in entering the technical information as well as the need for the user to become intimately familiar with the hard disk specifications and computer etiquette.

SUMMARY OF THE INVENTION

The present invention is a system and method for providing a more user-friendly architecture for a personal computer. Specifically, the system and method provides for a way of conveniently and efficiently apprising the personal computer of the "type" information corresponding to a user installed mass storage device(s) with minimal user involvement and user expertise.

One embodiment of the present invention is a system and method in a personal computer for auto-detecting the configuration of a user-installed mass storage device(s), such as a hard disk drive. The system comprises a unique blend of software and hardware.

More specifically, a user-installed mass storage device has a first configuration initially unknown to the personal computer. A first means permanently stores various configurations corresponding to various mass storage devices. A second means automatically detects the first configuration. A third means compares the first configuration with the various configurations. A fourth means adopts the first configuration if it matches a configuration in the various configurations of the first means. Finally, a fifth means communicates to the user a type denoting the mass storage device configuration.

Another embodiment of the present invention is a system and method for allowing a user to either input configuration or make a selection of a configuration from various configurations saved in the personal computer, notwithstanding a particular configuration auto-detected by the personal computer. After the input or the selection, the system permits the personal computer to interact with the mass storage device in accordance with the configuration corresponding to the input or the selection.

Yet another embodiment of the present invention is a system and method for hard disk drives. The user is displayed a series of user-friendly information panels. A first information panel has a hard disk indicator, a hard disk type indicator, a capacity indicator, and a custom indicator. A second information panel has a list of hard disk drive types available for user selection for each user-installed hard disk. A third information panel has a hard disk type indicator for a particular user-installed hard disk and a means for allowing a user to input custom operating characteristics for the hard disk. Even an uneducated computer user can quickly and correctly configure the PC architecture by selecting the correct type for a mass storage device.

Further objects and advantages of the present invention will become apparent to one skilled in the art upon examination of the following drawings and detailed description. It is intended that any additional objects and advantages be incorporated herein.

BRIEF DESCRIPTION OF THE DRAWINGS

The present invention as defined in the claims can be better understood with reference to the text and to the following drawings.

FIG. 7 is a flowchart 700 illustrating at a high level the interface of the system configuration utility 704 to the primary software, or overlay 702, of the present invention;

FIG. 8 is a flowchart 800 which shows a high level functioning of software of the present invention;

DETAILED DESCRIPTION

In the following description of the present invention, and throughout the specification, the term "system" is used for shorthand purposes to mean apparatus, method, or a combination of both apparatus and method. Moreover, it should be understood that a "system" could refer to an embodiment comprising software, hardware, or a combination of both software and hardware.

I. Hardware

Figure 1:
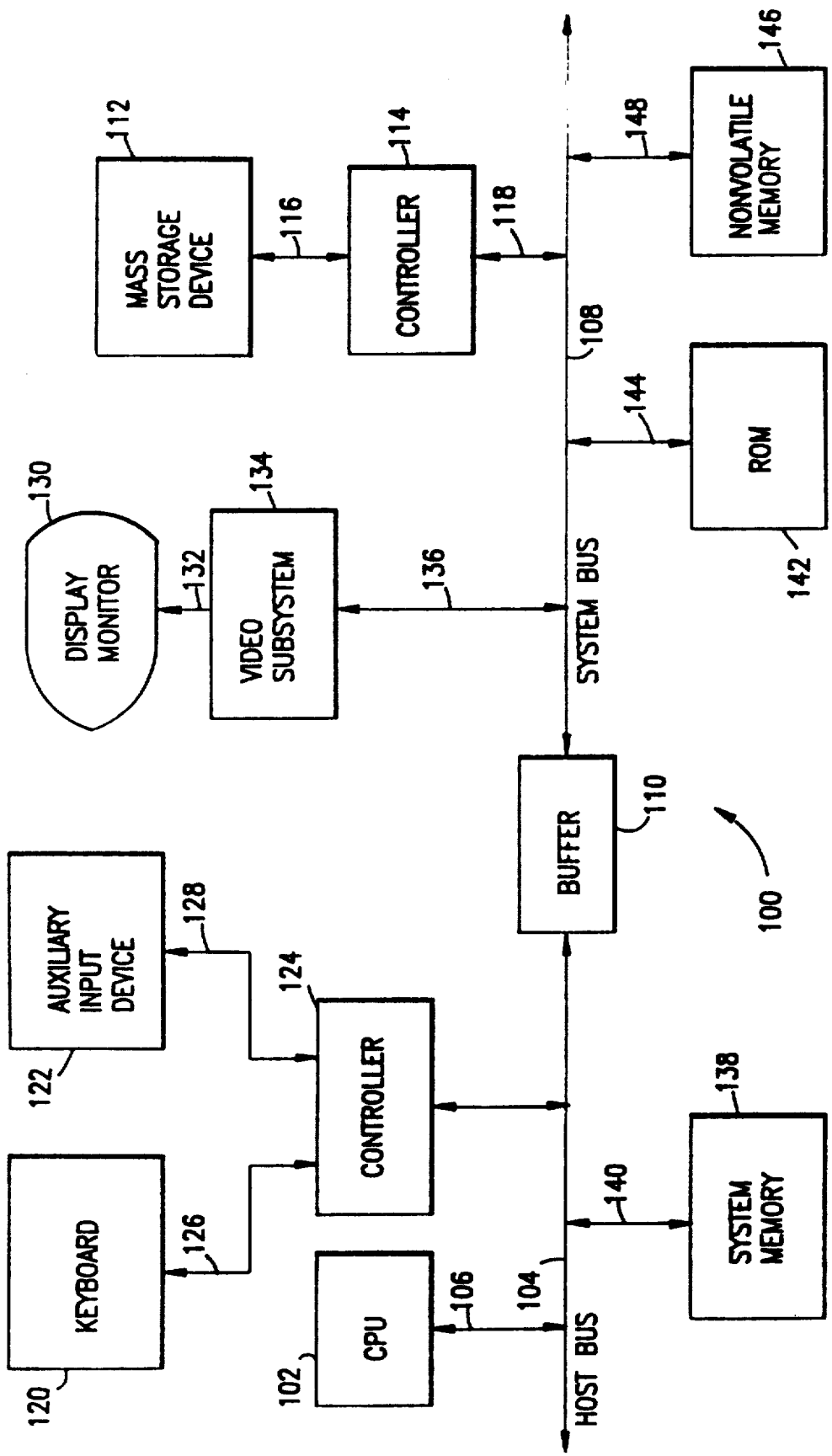
FIG. 1 illustrates a high level flowchart block diagram of a PC architecture 100 in which the present invention may be implemented.

The system of the present invention uses the personal computer (PC) architecture as shown in FIG. 1. The PC comprises a central processing unit (CPU) 102 connected to a host bus 104 via a bus 106. The CPU 102 can be any one of the family of conventional microprocessors manufactured by the Intel Corporation, Calif., U.S.A., including but not limited to the 8086, 80286, 80386, 80386D, 80386SX, or the 80486 microprocessor.

The host bus 104 connects to a system bus 108 by way of a buffer 110. Generally, all the hardware components of the personal computer communicate via the described host/system bus network.

A mass storage device 112 is initially installed by a user into the personal computer of FIG. 1. The mass storage device 112 could be, for example, a flexible (floppy) disk, a hard disk, or a tape drive. Moreover, the mass storage device has a specific configuration identified by a "type," which is comprised of data bytes.

The mass storage device 112 is controlled by controller 114 through a bus 116. The controller 114 is usually locally situated with respect to the mass storage device 112. The controller 114 is connected to the system bus 108 via bus 118. Upon receipt of control signals from the CPU 102, the controller 114 performs the requisite data transfers between the mass storage device 112 and the CPU 102. The controller 114 must be aware of the specific configuration, or configuration, of the mass storage device 112 in order to generate proper control signals.

In the present invention, the user interacts with the personal computer through a keyboard 120 and/or an auxiliary input device 122. The auxiliary input device 122 could take the form of, for example, a mouse or a trackball, which are conventional serial input devices in the PC industry. A controller 124 via respective buses 126 and 128 receives data signals from and controls the keyboard 120 and auxiliary input device 122. Note that any means by which the user may communicate to the PC may be incorporated for purposes of the present invention.

The personal computer communicates to the user over a conventional personal computer display monitor 130. The display monitor 130 is driven through a bus 132 by a video subsystem 134, which is connected to the system bus 10B of the personal computer via bus 136. Any means by which the PC may communicate to the user may be incorporated for purposes of the present invention.

II. Software

With regard to personal computer architecture 100 of FIG. 1, software of the present invention exists in several different locations at several different times. It should be noted that these software components could have been designed to exist in only one hardware device or in more hardware devices than exist during the operation of the present invention. All embodiments to implement the methodology of the preferred embodiment are intended to be incorporated herein by reference.

The primary software which controls the present invention resides during operation in the system memory 138, which communicates to the host bus 104 through a bus 140. This software may be derived from any conventional means. In the preferred embodiment, the user inputs this software via any nonvolatile storage device (not shown), such as a floppy disk, hard disk, tape, or similar device, communicating to the system memory 138 via the host bus 104 or via the system bus 10B.

Other secondary software which functions under the control of the above primary software in the system memory 138 exists, at least initially, in a Read-Only Memory (ROM) 142. This secondary software is a part of the Basic Input Output System (BIOS) program encoded in the ROM 142, which communicates through a bus 144 to the system bus 108. However, during the initial stages of the booting process for performance reasons, the BIOS program in the BIOS ROM 138 is shadowed, or copied, into the system memory 138 via the bus 140, the system bus 108, the buffer 110, the host bus 104, and a bus 144. Accordingly, the portion of the system of the present invention which is contained within the BIOS program is thereafter implemented from the system memory 138.

A further portion of the software of the present invention exists within the nonvolatile memory 146, communicating to the system bus 108 through a bus 148. This secondary software is often referred to as the system configuration. A detailed discussion of the two sources of secondary software, the primary software mentioned above, and their interrelation will be described in further detail below.

III. Operation

Figure 2:
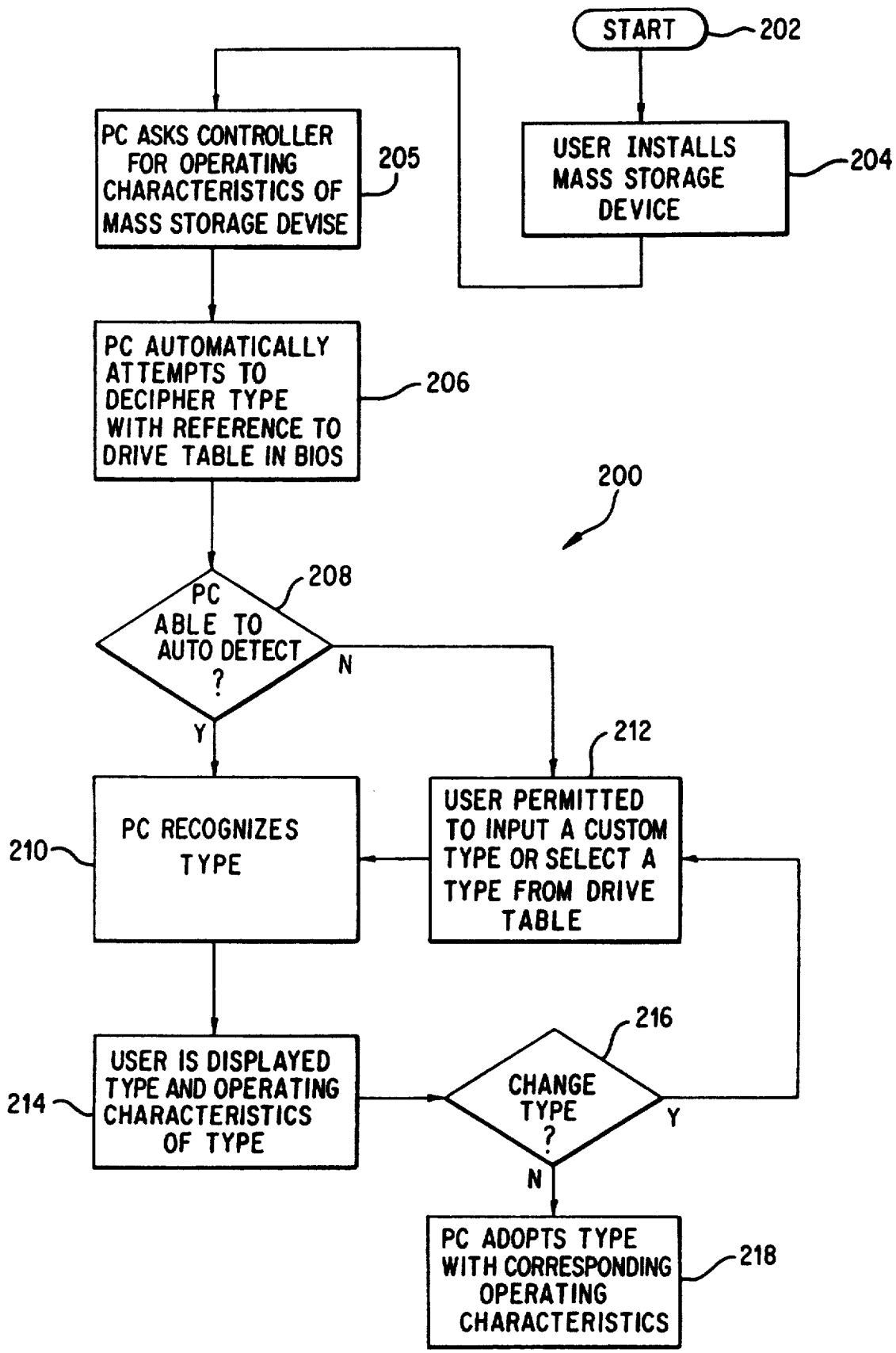
FIG. 2 is a flowchart 200 which shows a high level functioning of the present invention using the PC architecture 100.

FIG. 2 is a high level flowchart 200 which shows the physical manifestation of the operation of the present invention. The flowchart 200 is an attempt to articulate a very high level cursory understanding of the present invention. The flowchart 200 will be discussed below with reference to both FIGS. 1 and 2.

The flowchart 200 begins at start flowchart block 202. At flowchart block 204, a mass storage device 112 is installed by the user into the personal computer architecture 100. Then, at flowchart block 205, the personal computer architecture 100 asks the controller 114 for the operating characteristics of the user-installed mass storage device 112.

The system of the present invention causes the PC architecture 100 to attempt to automatically decipher, or "auto-detect," the type of the mass storage device 112, as indicated at flowchart block 206. When auto-detecting, the controller 114 is consulted for information about the mass storage device 112.

The information obtained is compared to data within drive tables having the configurations of numerous industry-standard disk drive types. At least one drive table resides in the BIOS program, which was originally contained in the ROM 142. Another drive table exists in the primary software of the present invention.

If upon comparison no match is recognized in the drive tables, a translation algorithm(s) within the primary software attempts to decipher the configuration of the mass storage device 112.

Finally, reference is made to the nonvolatile memory 146, because this memory ma have relevant information about the mass storage device 112.

With reference to flowchart block 208, if the PC is able to auto-detect the type, then the PC recognizes the type as shown in flowchart block 210. Otherwise, the PC will permit the user to input a custom type at flowchart block 212 and then the PC recognizes the inputted type at flowchart block 210.

After recognizing the type, the PC displays to the user via display monitor 130 the type information including the operating parameters corresponding to the type as indicated at flowchart block 214. It should be noted that other forms of communication to the user to obtain the same result are envisioned, for example audio communication, and that these embodiments are intended to be incorporated herein by reference.

Next, the user is given an opportunity to modify or change the type information recognized by the PC at flowchart block 216. The user changes the information or communicates the desire not to change the information via the keyboard 120 or the auxiliary input device 122. If the user does not wish to change the recognized information, then the PC adopts the type information if it is compatable with the PC and operates under the configuration identified by that type, as indicated in flowchart block 218.

Other aspects of the present invention will be apparent from the discussion of the preferred embodiment set forth below.

IV. Preferred Embodiment

A. Hardware

The preferred embodiment of the present invention utilizes PC architecture 100 with disk drives A, B, C, and/or D connected to the system bus 108 via respective controllers 318, 320, 322, and 324. Disk drives A and B are vendor-installed drives and their configurations are known to the personal computer. They could be capable of receiving flexible, or "floppy," disks, hard disks, or any other comparable storage device. The discussion that follows will be directed to an embodiment wherein drives A and B ar adapted to receive floppy disks. It should be noted that the principles of the system of the present invention can be applied to apprise the PC architecture 100 of the configuration of disk drives A and B.

Also in the preferred embodiment of the system, two mass storage devices 112 in the form of hard disks are installed in disk drives C and D by the user. The personal computer does not initially know their configurations. In the system of the present invention, a hard disk is installed as the mass storage device 112. Although the discussion that follows will make reference only to a hard disk 112, it should be appreciated that the system of the present invention is applicable to any species of mass storage apparatuses. Further, these alternative embodiments are intended to be incorporated herein by reference.

As will be discussed below, the system provides for a series of information panels to be displayed on the display monitor 130 along with auto-detection logic which leads the user to quickly select or input the type for a particular installed hard disk.

B. Operation

In the preferred embodiment of the present invention, three different information panels containing varying information with respect to each of the user-installed disk drives may be observed on the display monitor 130. These information panels apprise the user of the disk drive types which have been automatically detected, or "auto-detected". Further, these information panels may be used by a user to select from a list of conventional disk drive types or even enter custom types pertaining to non-listed hard disks. Any number of panels with any variation of information content may be used depending on the species of mass storage device utilized along with the requisite information needed to properly characterized its configuration.

Figure 4:
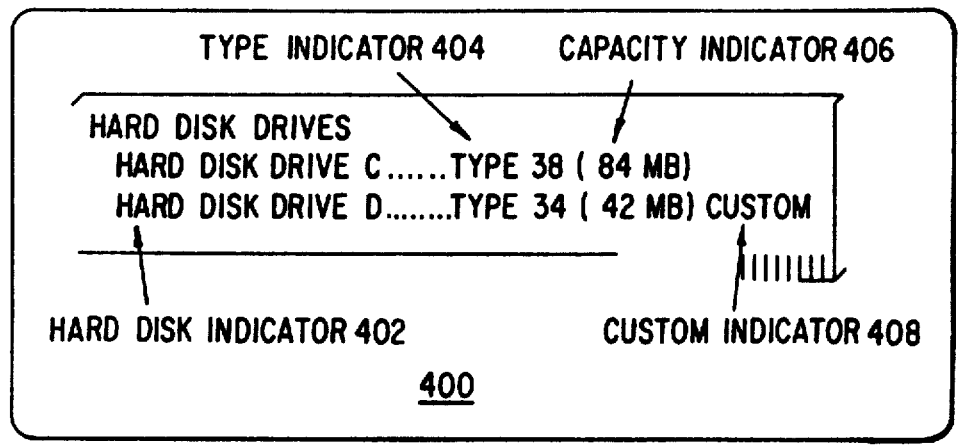
FIG. 4 is a first information panel 400 shown to a user on display monitor 130.

A first information panel 400 that can be viewed on the display monitor 130 of PC architecture 100 is shown in FIG. 4. The information panel 400 shows essentially four important parameters corresponding to the various disk drives installed in the PC architecture 100 by the user. The nature of the parameters displayed in this and other information panels described below depends on the species of mass storage device installed in the PC. Any parameters necessary to identify a particular type of mass storage device can be displayed and those embodiments are intended to be incorporated herein.

With reference to the first information panel of FIG. 4, a hard disk indicator 402 identifies the hard disk drive in terms of alphanumeric symbols, i.e., C, D, etc.. As shown, each disk drive is allocated an exclusive line entry.

Another parameter for each entry is a type indicator 404. The configuration of most conventional hard disks can be described with a type which comprises 16 bytes of information. However, it should be noted that some hard disks do not use types to describe their configurations. The 16 bytes describes the totality of configuration of the particular hard disk. The type indicator 404 shown in the first information panel 400 represents the type which had been auto-detected, or which has been inputted by the user. Hence, a type indicator is assigned to each corresponding hard disk drive and resides next to the hard disk indicator.

The next parameter of information panel 400 is a capacity indicator 406 for each entry. This indicator informs the user of the storage capacity in megabytes of each corresponding hard disk. This parameter is shown in parenthesis adjacent to the type indicator.

Finally, a custom indicator 400 can be placed on each entry as illustrated. The BIOS program has a drive table of preassigned hard disk types covering a wide range of industry-standard hard disks. The custom indicator informs the user whether the "type" of the hard disk corresponds with one of auto-detected by the PC architecture 100, or alternatively, is a customized entry of a type entered by the user. The BIOS drive table in the preferred embodiment comprises 47 preassigned hard disk types. The number "47" is arbitrary to hard disk drives and could be expanded or reduced depending on the industry-standard outlook of the mass storage device. Moreover, because these types are encoded in the BIOS program which is initially in ROM 142, they cannot be altered, unless the ROM 108 is changed or replaced. When a customized type entry is made by the user, one of the fixed entries in the drive table, which has been shadowed from the ROM 142 to the system memory 138, is reassigned with 16 bytes of new data provided by the user pertaining to hard disk not having a preassigned type in the BIOS drive table.

Figure 5:
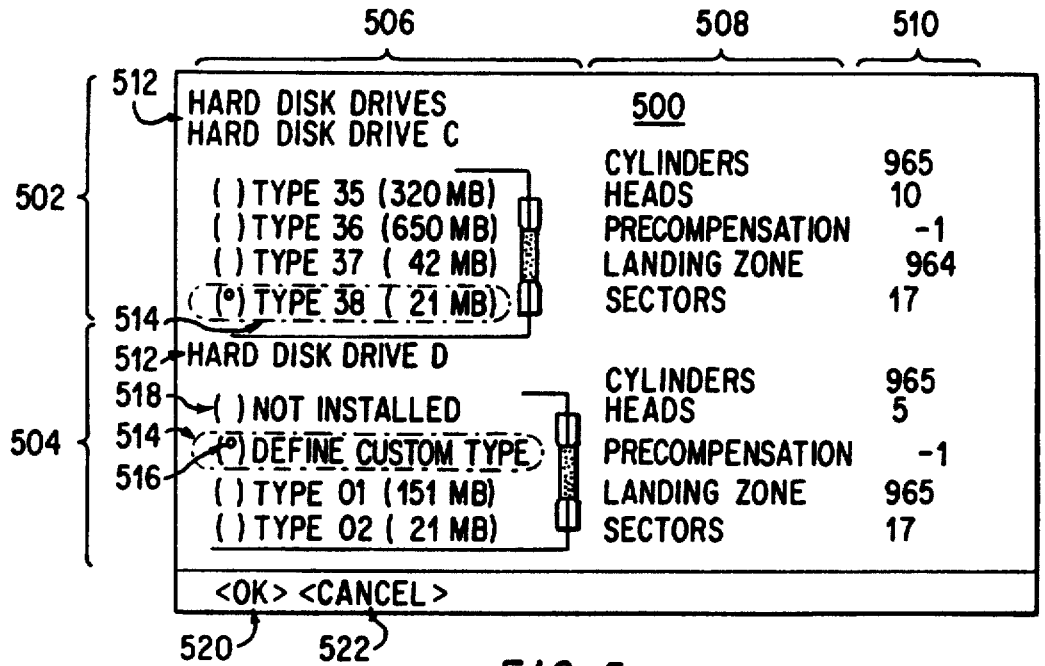
FIG. 5 is a second information panel 500 shown to a user on display monitor 130.

FIG. 5 shows a second information panel 500 that may be observed by the user in the preferred embodiment. The information panel 500 comprises a variety of information fields and parameters. From this panel, the user may select any of the disk types stored in the drive table within the BIOS program; alternatively, the user may Jump to a third information panel 600 where a customized type may be entered.

The second information panel 500 is sectioned into disk drive information fields 502 and 504 containing information corresponding to each of the user-installed disk drives C and/or D. The number of fields in the second information panel 500 is equal to the number of user-installed disk drives. Each disk drive field 502 and 504 is further divided into information subfields 506, 508, and 510.

Information subfield 506 lists all of the available types, which are stored in the drive tables, pertaining to each of the user-installed disk drives C and/or D. An option is selected under each drive title 512 by first moving, preferably by scrolling, a selection indicator 514, or "radio button," to a position adjacent a corresponding line entry. To acknowledge the selection, the user can press the "enter" key on keyboard 120. If a mouse is used as the auxiliary input device 122, the option can be entered by pressing the mouse button twice.

The selection indicator 514 may be anything, e.g., any video or audio cue, capable of communicating to the user that a particular line entry is being identified. In the preferred embodiment, the color shading of a line entry where the selection indicator 514 resides is changed with respect to the background shading in addition to placing a "*" symbol 516 on the line entry.

Furthermore, the list of options in each listbox of subfield 506 could be identical under each hard disk title 512. However, it may be desired or necessary in some instances to vary the allowable types available under each hard disk title 512 from disk drive to disk drive depending on the drive's specifications or other PC demands.

The information in the listbox of subfield 506 is taken directly from the drive tables previously mentioned. Accordingly because different computers have different BIOS programs with varying drive tables, if any, the listbox adapts to the particular machine. Note that for each entry in the drive tables, the disk capacity is also computed and displayed in megabytes by the system of the present invention. If the primary software of the present invention cannot auto-detect a mass storage device, then a generic listing is generated containing types 1-99. In this case, the types do not have corresponding storage capacities because no information is available about the specific type.

A further user-friendly feature of the listbox in the second information panel 500 is the ability to easily communicate to the PC whether a disk drive, e.g., C and/or D, is not installed. All the user need do is move the selection indicator 514 to the line entry 518 entitled "Not Installed" and then enter this option. Another option within the listbox is the ability to move to a third information panel 600 where a customized type may be entered by the user. To exercise this option, the user moves the selection indicator adjacent to the line entry entitled "Define Custom Type" and enters this option.

Subfield 508 shows specific information for a disk drive type which is identified by the selection indicator 514. As the user scrolls through the list of drive types, the information in subfield 50B changes in real time to reflect the data for the currently identified drive type. The data is taken directly from the drive tables contained within the BIOS program and the primary software and, like the types in the listbox of subfield 506, will change from computer to computer. If in the event that a drive table cannot be accessed in the BIOS program, then the parameters displayed in subfield 508 default to zeros.

The user-friendly subfield 508 permits the user, and notably, PC dealers, to view the configurations corresponding to each disk drive type within the drive table. The configuration information in subfield 5OB includes, but is not limited to, the following operating parameters: cylinders, heads, pre-compensation, landing zone, sectors, and any other parameters required to adequately specify the device. Consequently, this feature eliminates the tedious task of consulting a manual for the "type" information. Moreover, the feature eliminates human error as well as user confusion when entering new parameters or modifying existing type parameters. The feature represents a big aid to a marginally educated computer user.

In the event that the user wishes to return to information panel 400 from the present panel 500 without making any changes, the user can enter "CANCEL" at the keyboard 120 or the auxiliary input device 122. "Cancel" is entered at the keyboard 120 by tabbing a selection cursor (not shown) at the "<CANCEL>" location 520 as shown on the information panel 400 and then pressing the "enter" key. Alternatively, the user can use an auxiliary input device 122, such as a mouse 122, to position the selection cursor (not shown) over to the "<CANCEL>" location 520 and then press the mouse contact button twice.

If the user wishes to return to the first information panel 400 and wishes to preserve any changes made while in the second information panel 500, the user can enter "OK" at the "<OK>" location 520 using the same procedure as for "CANCEL."

Figure 6:
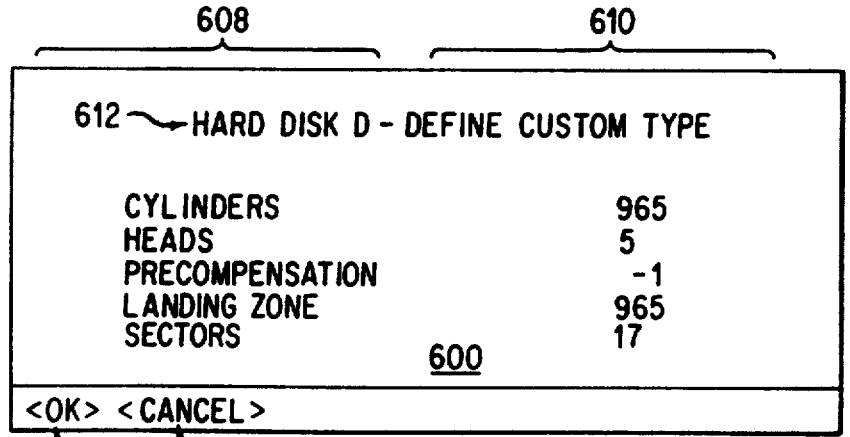
FIG. 6 is a third information panel 600 shown to a user on display monitor 130.

FIG. 6 illustrates a third information panel 600 which can be observed by the user via display monitor 130. The reference numerals of FIG. 6 have similar correspondence with those of FIG. 5. The information panel 600 is displayed when the user is to enter a custom hard disk type, which is a type not specified in the drive tables or ascertainable via a translation algorithm(s). This third information panel 600 is displayed when the user selects the line entry entitled "Define Custom Type" of the second information panel 500 in FIG. 5.

With regard to FIG. 6, a hard disk drive indicator 612 shows to which hard disk drive the information panel 600 corresponds. Subfields 608 and 610, corresponding to subfields 508 and 510 of FIG. 5, are displayed under the hard disk drive indicator 612. The subfield 610 may be manipulated by the user in accordance with the specifications of the non-listed hard disk by tabbing through this subfield and entering the appropriate parameters. When the appropriate parameters have been entered, the preferred embodiment maps the entered values into a type location reserved in the drive table of the BIOS program which is in the system memory 138. The system of the preferred embodiment has been designed so that any parameters entered with respect to disk drive C is mapped into the type 33 location and any for disk drive D is mapped into the type 34 location.

The "<OK>" and "<CANCEL>" options designated by respective reference numerals 620 and 622 of information panel 600 have similar functioning to those of information panel 500 with several exceptions. If "<OK>" is entered, the system will return the user back to the first information panel 400, instead of the previous second information panel 500.

Furthermore, after the user has entered the desired hard disk parameters and the "<OK>" option is selected by the user, a test is performed to insure that the entered configuration is in accord with the limits of the "MICROSOFT" DOS operating system produced by Microsoft, Inc., Redmond, Wash., U.S.A. This user-friendly feature helps to prevent human error, i.e., to prevent the user from inadvertently entering incompatible hard disk parameters.

If the user enters parameters outside the bounds of DOS limits, the user is informed of this status. However, the user may elect to keep the parameters nonetheless for certain reasons. One reason might be that the user is configuring the PC for use with another operating system, such as, for example, the "UNIX" operating system.

C. Software

Recall from the discussion above that the software for implementing the preferred embodiment exists at several different locations within the PC architecture 100. The primary software is loaded in a conventional manner into the system memory 138, whereas the secondary software resides in the ROM 142 and the nonvolatile memory 146.

The primary software is vendor specific code and is stored onto a floppy disk(s) in executable form along with the system configuration utility. Accordingly, the primary software and the system configuration utility are loaded into the system memory 138 of the PC architecture 100 via the disk drive A and/or the disk drive B.

As shown in FIG. 7, the primary software is often referred to as an "overlay" denoted by reference numeral 702. It runs concurrently with a system configuration utility 704 to replace the generic functionality of the utility 704. The overlay 702 is permitted to perform in this manner because the utility 704 provides a means, or "hook," wherein the software for the overlay 702 is able to take control of the PC architecture 100 of FIG. 1.

As shown by reference arrow 706, the system configuration utility 704 passes control of a stack frame containing function code to the overlay 702, and the system configuration utility 704 then ceases execution. A stack frame is a temporary buffer with a specific format and situated in a specific location within the system memory 138. The function code tells the overlay 702 what the user has done at this point. In turn, the overlay 702 runs pursuant to the function code. The overlay 702 will then return control of the stack frame to the system configuration utility 704 as shown by reference arrow 70B, with data in response to the function code, and the system configuration utility 704 will continue execution.

Although the present invention is not a multi-tasking system, such a system is envisioned, and it is intended that such a system be incorporated herein by reference.

Worth noting is that the actual code that draws characters on the display monitor 130 is part of the generic system configuration utility. Moreover, the overlay 702 defines the specific data structures, defines the behavior of the information displayed on the display monitor 130, and provides a unique vender "touch and feel".

The system configuration utility 704 is the industry-standard EISA system configuration utility which was co-developed by Compaq, Inc., Houston, Tex., U.S.A., and Hewlett-Packard, Palo Alto, Calif., U.S.A. and which is licensed to the entire computer industry by the MCS Corporation, Dallas, Tex., U.S.A.

FIG. 8 is a flowchart 800 showing the highest level of software of the overlay 702. Three hooks are present in the system configuration utility 704 for permitting the overlay 702 to take control. These three hooks are referred to as an "INIT" call, a "CHANGE" call, and an "UPDATE" call. Each of these hooks has a corresponding subroutine in the overlay 702. The three subroutines are called, respectively, a "function INIT," a "function CHANGE," and a "function UPDATE." These subroutines and their interaction among each other and the system configuration utility 704 will be discussed in detail below.

With reference to the flowchart 800, the utility 704 calls the overlay 702. The call could be an INIT, CHANGE, or UPDATE call. As shown at flowchart block 802, the overlay 702 senses whether it is the first time that a call has been made to it by the utility 704. The overlay 702 is able to make this determination observing the value in a particular memory location within the system memory 138 which value is always present during the first entry into the overlay 702. If it is the first call, then the overlay 702 initializes its internal data structures, including variables, etc., as indicated at flowchart block 804.

The overlay 702 next proceeds to flowchart block B06, where it is determined whether the call is an INIT call. If the call is an INIT call, then the function INIT is performed as shown at flowchart block 808 and then the overlay 702 returns control to the system configuration utility 704. flowchart block 808 is broken down into a flowchart 900 shown in FIG. 9. During the function INIT, the overlay 702 auto-detects the configurations and determines the types of hard disks residing in the disk drives, which are C and/or D in the preferred embodiment. The information displayed in the first information panel 400 is information that is retrieved by the overlay 702 during the INIT call. However, the utility 704 defines the format of the first information panel 400.

If it is determined that no INIT call exists at flowchart block 806, then a decision is made as to whether the call is a CHANGE call as shown at flowchart block 810. If the call is a CHANGE call, then the function CHANGE is performed at flowchart block 812, and then the overlay 702 returns control over to the system configuration utility 704. Flowchart block 812 has been broken down into flowchart 1000 of FIG. 10 with sub-level flowcharts 1100 and 1200 of FIGS. 11 and 12, respectively.

A CHANGE call will be sent from the system configuration utility 704 when the user of the PC is viewing the first information panel 400 and indicates a desire to jump to the second information panel 500, which action indicates a desire to "change" a disk drive type. From the second information panel 500, the user can then jump to the third information panel 600 if the user so chooses. A CHANGE call may never occur if the disk drives are auto-detected and the user does not wish to tamper with the configuration retrieved by the PC architecture 100. Also, note that the second information panel 500 as well as the third information panel 600 are completely generated by the overlay 702.

If it is determined that no CHANGE call exists at flowchart block 810, then a decision is made as to whether the call is an UPDATE call as shown at flowchart block 814. If the call is an UPDATE call, then the function UPDATE is performed at flowchart block 816, and then the overlay 702 returns control over to the utility 704. Flowchart block 816 has been broken down into a flowchart 1300 of FIG. 13. The UPDATE call from the system configuration utility 704 is instituted whenever the user has made changes to the system configuration and subsequently saves the changes. When the system configuration utility 704 cause the system configuration to be updated in the nonvolatile memory 146, the system configuration utility 704 sends an UPDATE call to all of its overlays to inform the overlays of the latest system configuration.

If it is determined that no UPDATE call exists at flowchart block 814, then the overlay 702 ignores the call as indicated at flowchart block 818, and the overlay returns control over to the system configuration utility 704. Flowchart block 818 insures that calls from the system configuration utility 704 to be designed in the future will not cause the overlay 702 to malfunction.

1. Function INIT

Figure 3:
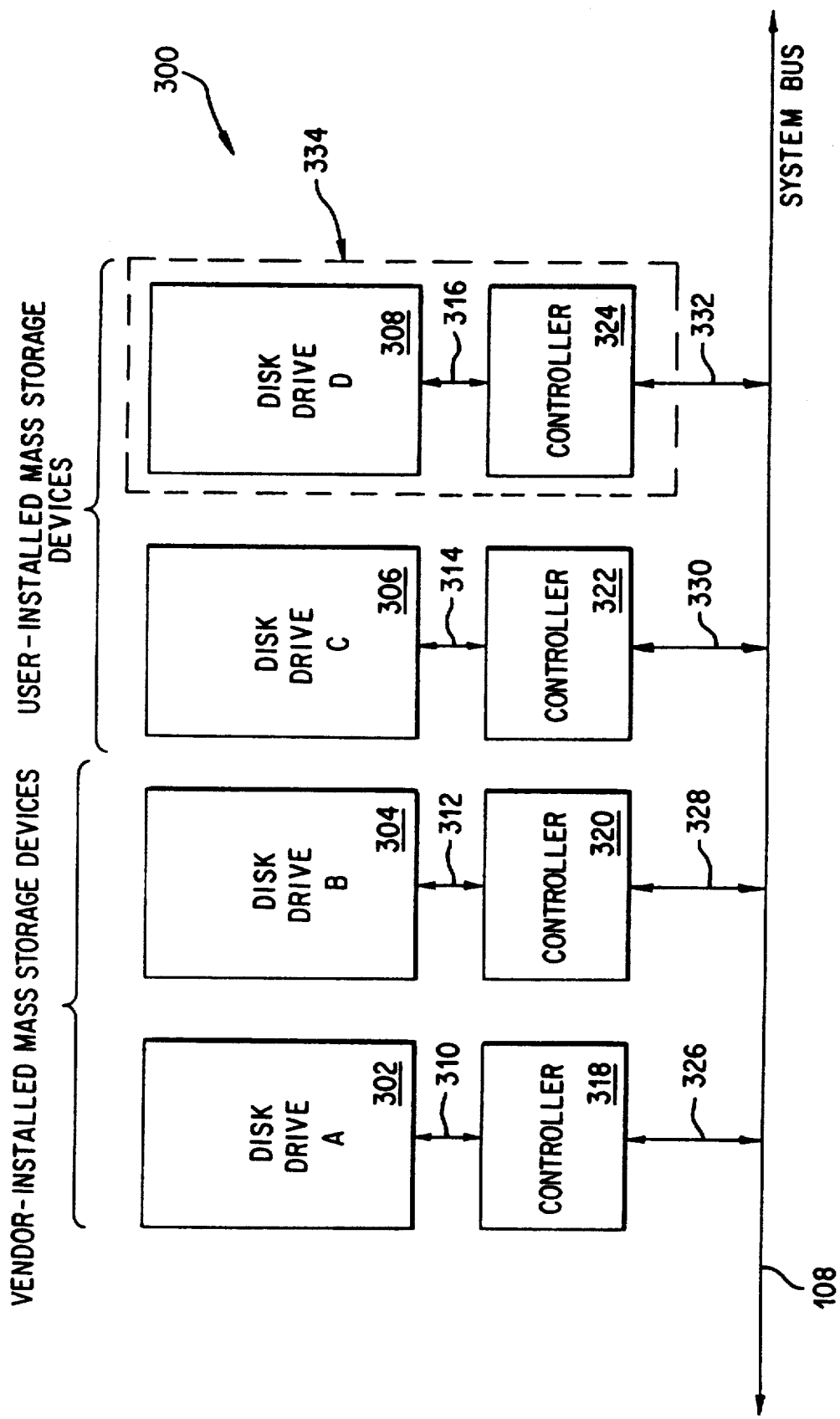
FIG. 3 is a preferred embodiment of the present invention where four disk drives A, B, C, and D are connected to a system bus 108.
Figure 9:
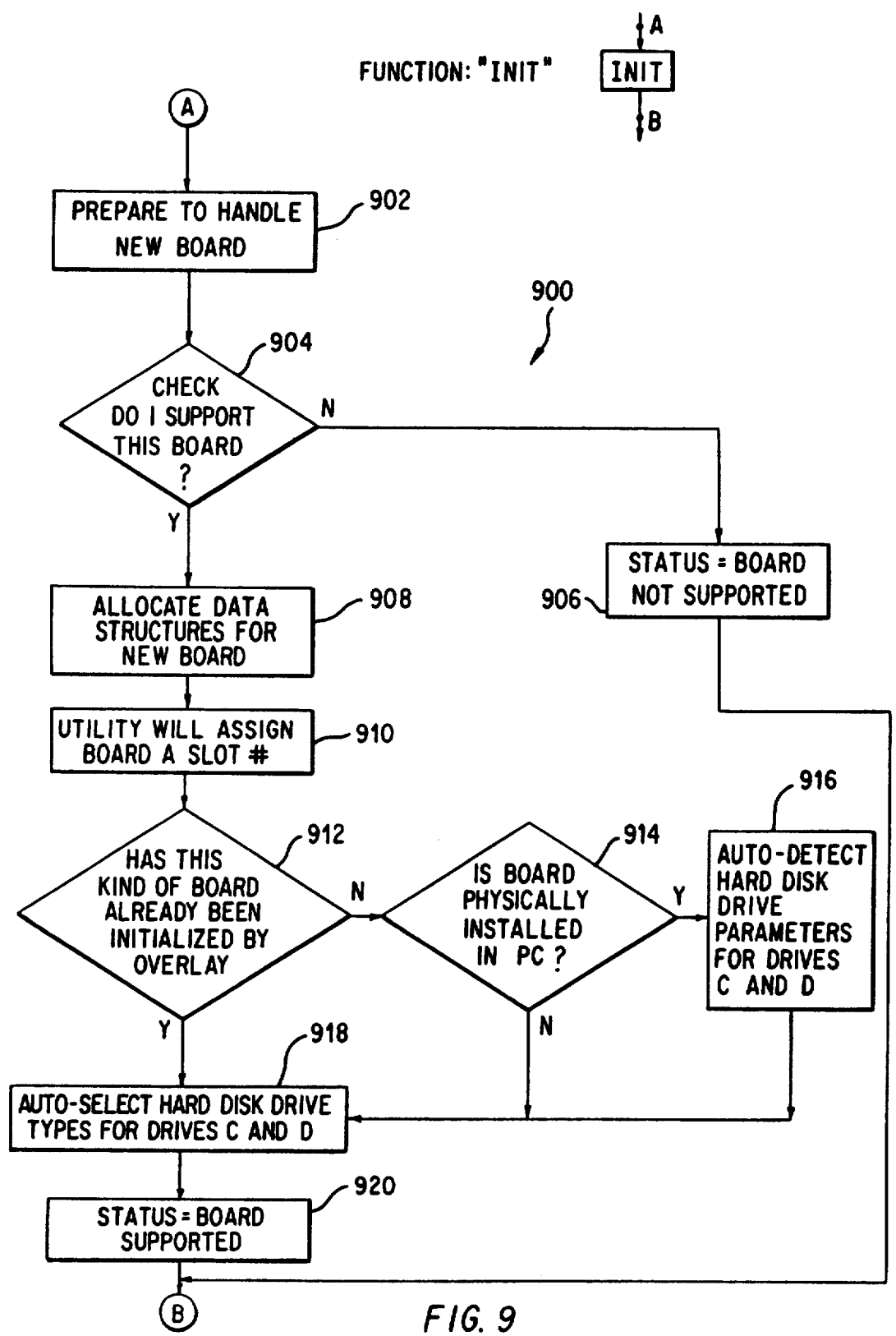
FIG. 9 is a flowchart 900 illustrating at a low level a function CHANGE.

A discussion of the function INIT follows with reference to FIG. 9. At flowchart block 900, the overlay 702 prepares to handle any new user-installed boards containing hard disk drives, which boards are inserted into the system bus 10B. With reference to FIG. 3, disk drive D and controller 324 can be situated on a board 334 specified by phantom lines. Similarly, any other disk drives, such as disk drives A, B, and/or C, with their respective controllers could be situated on a board. The overlay 702 allocates a portion of system memory 138 to hold data and variables that it will need to keep track of any new boards.

At flowchart block 904, the overlay 702 determines if it supports the new board(s). The identification of a board is sent in the stack frame from the system configuration utility 704 along with the function call to the overlay 702. From this information, the overlay 702 can make this determination. If a board is not supported, then the overlay 702 moves to flowchart block 906, where data is stored in the stack frame to be sent to the system configuration utility 704 indicating that the new board is not supported.

If the board is supported, then the overlay 702 allocates data structures in the system memory 138 for the new board, as shown in flowchart block 908. The data structures are needed to keep track of the name of the board, whether a hard disk resides on the board, whether a controller exists on the board, and other information relating to the CFG files.

At flowchart block 910, the overlay 702 recognizes the slot number allocated to the new board. The slot number is encoded in the stack frame sent from the system configuration utility 704 to the overlay 702. In Industry Standard Architectures (ISA) PCs, the user must inform the PC of the slot number via the keyboard 120 or some other means However, in Extended Industry Standard Architectures (EISA) PCs, the PC can auto-detect the slot information.

At flowchart block 912, the overlay 702 begins an optimization routine. A determination is made as to whether this type of board has already been initialized by the overlay 702. Initialization in this context refers to the process when a board has been interrogated with software by the overlay 702 to determine the board's configuration. During the initialization, a unique address is assigned to the associated disk drive controller, namely controller 322 and/or controller 324 in FIG. 3. If the board has already been initialized, then the overlay 702 takes a short cut by not re-initializing the board again. The overlay 702 then proceeds immediately to flowchart block 918. This procedure results in a substantial time savings, resulting in a user-friendly PC operation in real time.

If a new board has not been initialized, then the overlay 702 auto-detects whether a new board is physically installed, i.e., connected to the system bus 10B, as shown in flowchart block 914. With reference to board 334 of FIG. 3 for example, the overlay 702 checks for installation by sending commands via I/O registers to the hard disk controller 324. The overlay 702 then waits for responses that it would expect to receive if a hard disk controller was in fact installed in the PC architecture. If a hard disk controller 324 is installed, then the overlay 702 sends more signals to the hard disk controller 324 to cause the controller 324 to interact with the hard disk D, as shown in flowchart block 916.

When the controller 324 interacts with the hard disk D, the controller 324 solicits the particular configuration information, and then sends it to the overlay 702. If a board is not physically installed in the PC, then the overlay 702 moves to flowchart block 918.

At flowchart block 918, the overlay 702 compares all retrieved configuration information with the parameters listed in the drive tables of the BIOS program and of the overlay 702 containing the industry-standard disk drive types. In the preferred embodiment, the drive tables in the BIOS program are checked before the drive table(s) in the overlay 702. If no match is realized in any of the drive tables, then a translation algorithm(s) in the overlay 702 attempts to decipher the configuration. Finally, any information about the user-installed disk drives that is stored in the non-volatile memory 146 is retrieved and considered.

At flowchart block 920 the overlay 702 puts data in the stack frame to be returned to the system configuration utility 704 indicating whether the board is supported or not. If supported, the CFG information is placed in the stack frame for the system configuration utility 704. Worth noting is that all the text displayed in the first information panel 400 is derived from this CFG information.

2. Function CHANGE

Figure 10:
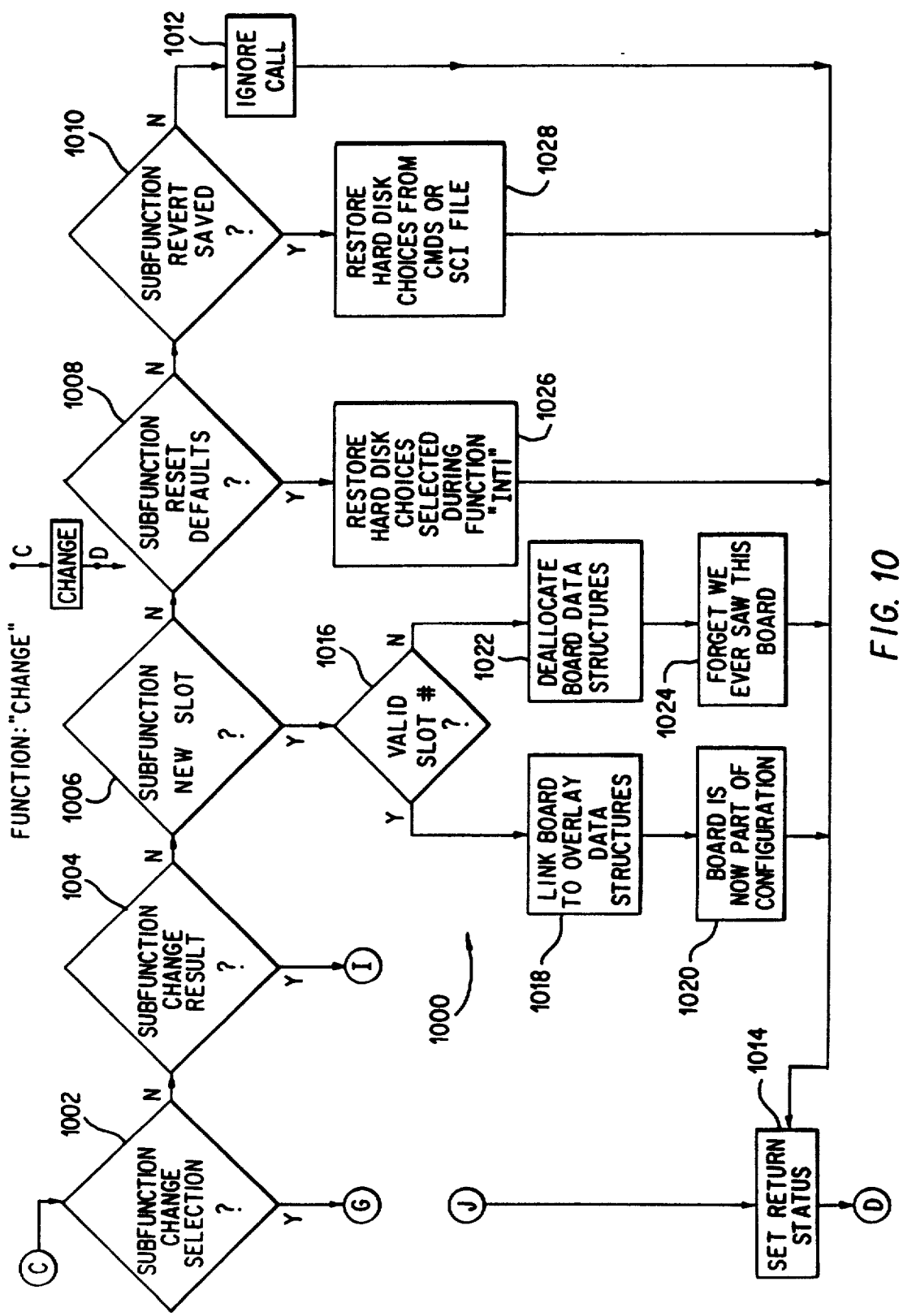
FIG. 10 is a flowchart 1000 showing at a low level a function CHANGE.

A discussion of the function CHANGE follows with reference to the flowchart 1000 of FIG. 10. The function CHANGE is called by the utility 704 when the user of the PC architecture 100 wishes to view the second and third information panels. In effect, the function CHANGE and these information panels permit the user to view the information that the overlay 702 utilized to select the disk drive types illustrated to a user in the first information panel 400.

A user is permitted to view the types auto-detected and permitted to select a different type irrespective of the type which was auto-detected by the PC architecture 100. This feature allows for a user-friendly flexible system. It is envisioned that in some cases the user may be able to enhance the performance of the PC by manipulating the type selection.

If the user chooses a different disk type than was auto-detected, the user's selection and the operating characteristics (configuration) retrieved from the controller 324 during the INIT function are recorded as secondary software in the nonvolatile memory 146 connected to the system bus 108. As a result, the next time that the PC architecture 100 runs, the overlay 702 can restore the user's type selection from the nonvolatile memory 146 and use it rather than the actual auto-detected type.

The function CHANGE is divided into subfunctions CHANGE SELECTION, CHANGE RESULT, NEW SLOT, RESET DEFAULTS, and REVERT SAVED. These subfunctions are specified in the stack frame by a second byte subsequent to a first byte which specifies the function CHANGE.

When the user wishes to view the second information panel 500, the system configuration utility 704 will issue a function CHANGE and one of the subfunctions as previously mentioned to the overlay 702 via the stack frame. As shown in flowchart blocks 1002, 1004, 1006, 100B, and 1010 of FIG. 10, the overlay 702 checks for the subfunction to be performed by examining a second byte in the stack frame. If the byte calls none of the subfunctions, then the call is ignored as shown at flowchart block 1012, similar to the procedure in flowchart block 818 of FIG. 8.

a. Subfunction CHANGE SELECTION

Figure 11:
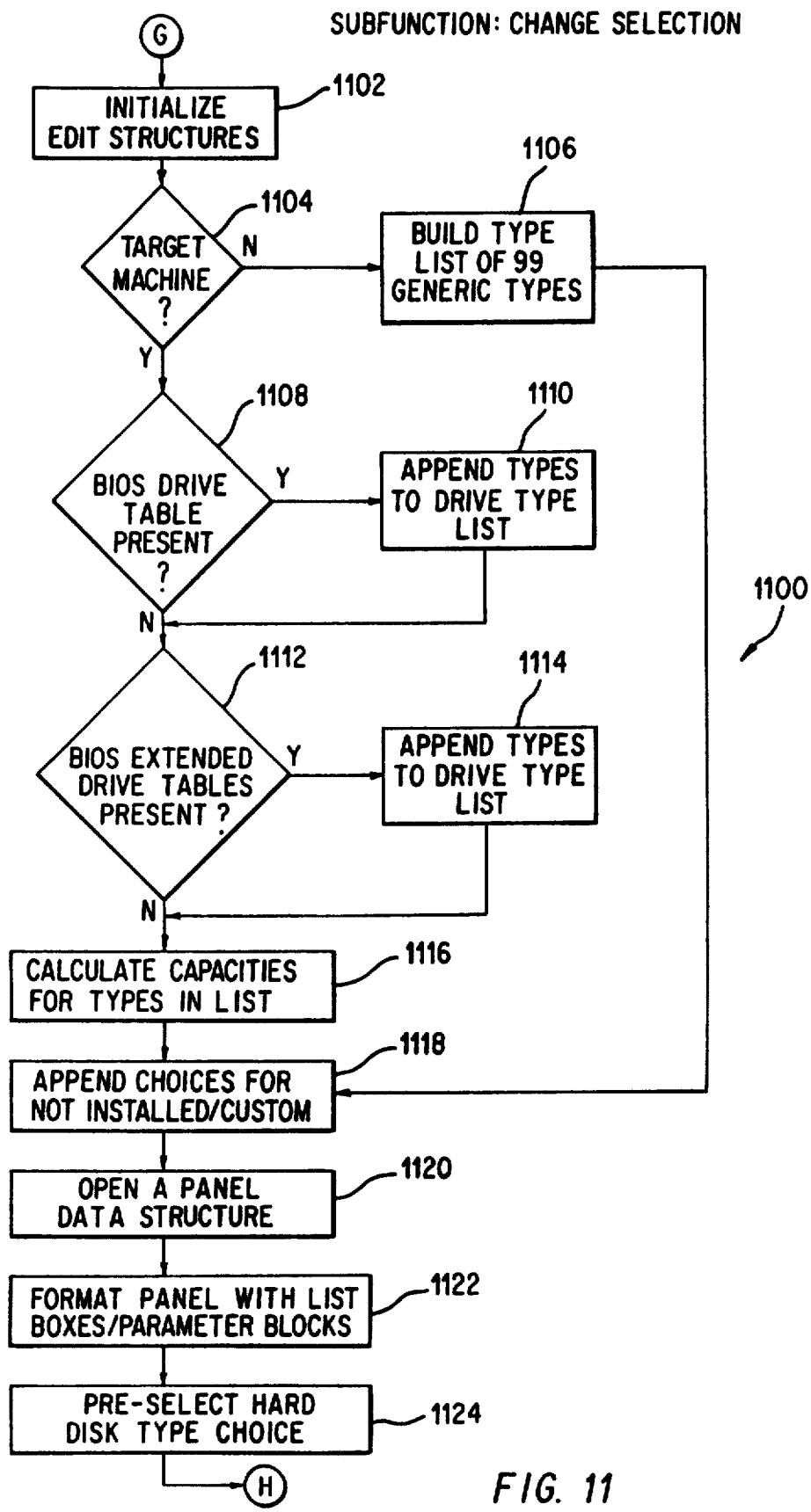
FIG. 11 is a flowchart 1100 which illustrates at a low level a substantial portion of a subfunction CHANGE SELECTION, which subfunction is continued on a flowchart 1200 of FIG. 12.

If the subfunction CHANGE SELECTION is detected at flowchart block 1002, then the software denoted by flowchart 1100 of FIG. 11 will be performed. At flowchart block 1102 of FIG. 11, the overlay 702 initializes its edit structures. The overlay 702 will keep track of the current type, which was displayed in the first information panel 400. This information is useful in the scenario when the user enters the second information panel 500, makes no changes, and then presses the option to return to the first information panel 400. <CANCEL> option to return to the first information panel 400.

The overlay 702 next proceeds to flowchart block 1104 of the flowchart 1100, where the overlay 702 observes whether the PC architecture 100 is a "target" architecture. The concept of "target" is defined by the system configuration utility 704. The system configuration utility 704 is designed to permit the user to configure the PC architecture in two ways. A target PC architecture is one in which the user will input the system configuration to the PC architecture. In contrast, a non-target architecture will not allow the user to change the system configuration of the PC, only model a possible configuration to be later input as a configuration to some other PC.

With regard to a non-target PC architecture, the configuration is usually stored on a floppy disk or by some other nonvolatile storage means. Thus, when the utility 704 of the non-target PC architecture runs, it uses the system configuration encoded in the storage device. Accordingly, when the overlay 702 is running on a non-target PC architecture, software signals from the overlay 702 cannot be sent to the ROM 142 and the disk drive controllers 322 and 324, because no assumptions can be made as to the identity and nature of the computer components in the architecture. Among other things, the BIOS that generated the system configuration might be different than the BIOS using the system configuration.

If the PC is a non-target machine, then the overlay 702 proceeds to flowchart block 1106, where a listbox of 99 generic types is constructed for the second information panel 500. The user is presented with these 99 generic types from which to choose. The BIOS program is not consulted for these types. Any selection made by the user is saved by the overlay 702. The user in this case needs to know what type is associated with his hard disk. Moreover, if the user subsequently uses the system configuration on a target machine, which has a drive table(s), and if the user selection matches a type entry in the drive table(s), then the utility 704 will automatically configure the PC.

If the PC is a target machine, then the overlay 702 proceeds to flowchart block 1108, where the overlay 702 begins the retrieval of disk drive types from one of several drive tables. Essentially three drive tables exist in the PC architecture 100 of the preferred embodiment. A first drive table exists in the BIOS program of the system memory 138. The first drive table is an industry-standard table. This first table is the first to be accessed at flowchart block 1108. If types are retrieved from this first table, then they are recognized and appended to the listing in the listbox of the second information panel 500, as indicated in flowchart block 1110.

A second drive table, or "extended, drive table, has been defined within the BIOS program. Furthermore, a completely separate third drive table has been defined in the overlay 702.

The second drive table and then the third drive tables are checked for after the first drive table has been examined, as shown in flowchart block 1112. Again, at flowchart block 1114 any retrieved types are recognized and appended to the listing of the listbox of the second information panel 500.

At flowchart block 1116, the overlay 702 calculates the capacities of the types in the listbox. Each disk drive type is defined in the drive tables by 16 bytes. However, these 16 bytes do not define the disk capacity. Therefore, a disk capacity is computed (1) by using information in the 16 bytes or (2) by assuming that the disk drive utilized is a 512 byte sector.

Next, the overlay 702 proceeds to flowchart block 1118, where the "Not Installed" and the "Custom" options are appended to the listbox. These options are logically generated because they are not contained within the drive tables. Recall that the "Not Installed" option, if exercised, tells the utility 704 that the disk drive at issue is not connected to the system bus 108. Further recall that the "Define Custom Type" option permits the user to jump from the second information panel 500 to the third information panel 600 in order to be able to add customized configuration parameters.

At flowchart block 1120, the overlay 702 allocates some of the system memory 138 and sends a call to the system configuration utility 704 indicating an intention to open a panel, namely, the second information panel 500. In turn, the system configuration utility 704 sends to the overlay 702 the data structures for the panel. At flowchart block 1122, the overlay 702 then formats the data structures. It dictates the text that will appear on the screen, the colors on the screen, the location of the text, and other similar display screen aspects.

The overlay 702 next moves to flowchart block 1124, the overlay 702 insures that the selection cursor as perceived by the user is in sync with the internal functioning of the overlay 702. In other words, the overlay insures that what the overlay 702 observes as the selection is actually what the user intended to be chosen.

Figure 12:
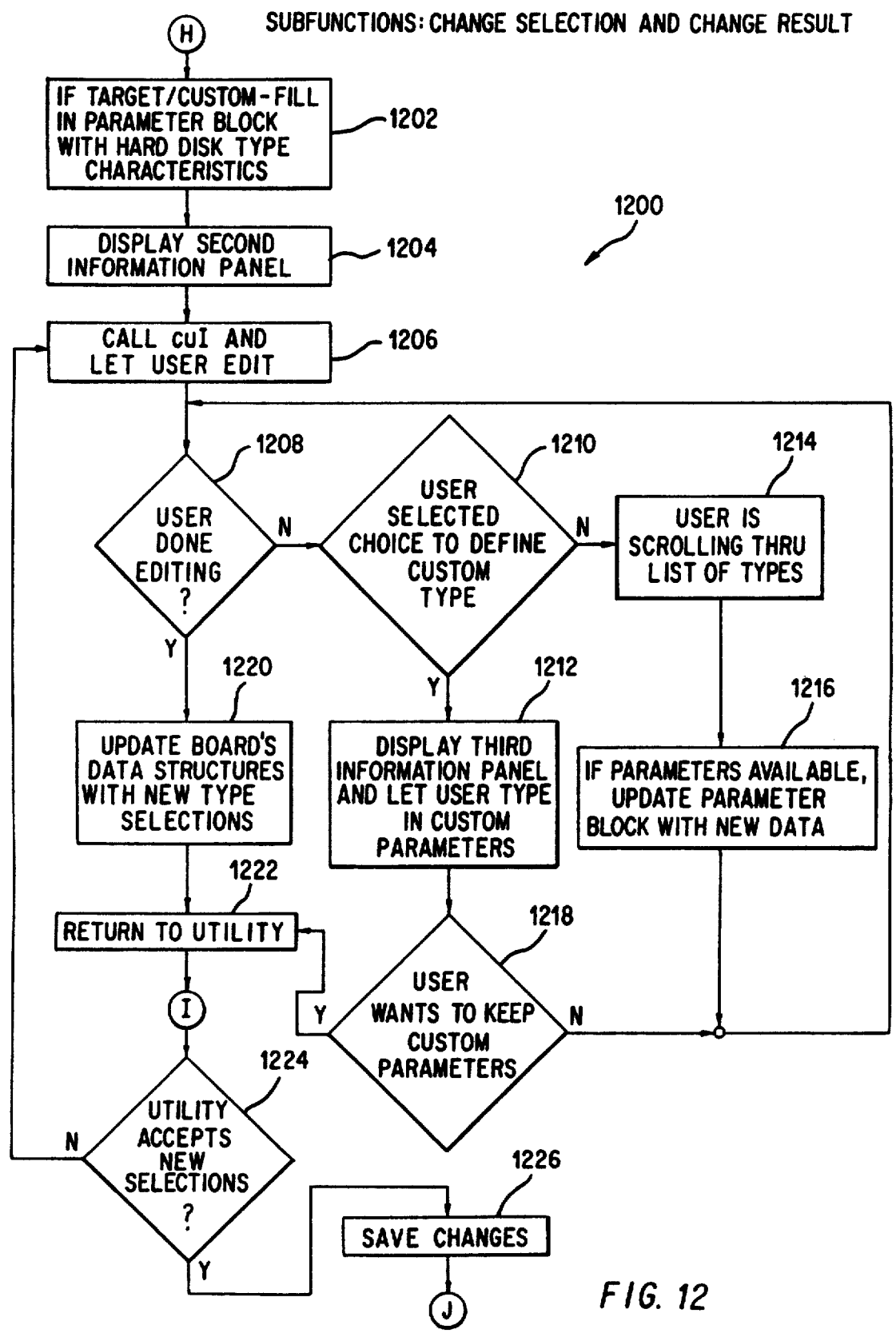
FIG. 12 is a flowchart 1200 illustrating at a low level the remainder of subfunction CHANGE SELECTION and a subfunction CHANGE RESULT in its entirety.

After flowchart block 1124 on flowchart 1100, the overlay 702 continues with flowchart block 1202 on flowchart 1200 of FIG. 12. At flowchart block 1202, the values of subfield 510 of the second information panel 500 corresponding to the disk drive parameters of subfield 50B are retrieved from the BIOS program. However, this action takes place only if the overlay 702 is running on a target machine as defined previously at flowchart block 1104 of FIG. 11. If th overlay 702 is operating in a non-target machine, all of the values default to zero, unless the custom type is selected.

Next, the overlay 702 causes the system configuration utility 704 to display the second information panel 500. After this action, the overlay 702 enters a mode where it waits for a response from the user.

As shown in flowchart block 1206, the overlay 702 gives control to the configuration user interface (CUI), which is the user interface subroutine located in the system configuration utility 704. The overlay 702 tells the CUI how to respond to certain keystrokes from the user before the overlay 702 relinquishes control. Note that all overlays would use this same CUI. The CUI observes inputs from the user, such as keystrokes on the keyboard 120 or the pressing of the contact button on the mouse 122.

At flowchart block 1208, a determination is made as to whether the user has completed editing. If the user is not done editing, then the overlay 702 moves to flowchart block 1210, where it decides whether the user has selected to define a custom type. If a custom type is to be entered, the overlay 702 displays the third information panel 600 and allows the user to type in the custom parameters at keyboard 120, as indicated at flowchart block 1212. Otherwise, the overlay 702 assumes that the user is scrolling through the types, as shown in flowchart block 1214, and moves to flowchart block 1216. When the user scrolls through the types, the CUI refers back to the overlay 702 between each line entry in the listbox so that the overlay 702 ca update the data placed in the subfield 510 corresponding to each line entry. The parameters are updated in real time.

In the event that the user is done editing at flowchart block 1208, then the overlay 702 proceeds to flowchart block 1220 and updates the board's data structures with any new type selections. The data structures updated include the local data structures plus those data structures that will be recorded in the nonvolatile memory 146.

The overlay 702 then turns over control to the utility 704 at flowchart block 1222. The system configuration utility 704 at flowchart block 1224 checks any changes made by the user to make certain that the changes jive with other computer components of the PC architecture 100. If the changes are not acceptable, the utility 704 will cause a message to be displayed on the display monitor 130 to this effect, and return control to the overlay 702 at flowchart block 1206 as shown in FIG. 12. If the changes are acceptable, then the overlay saves the changes, as shown in flowchart block 1226 and puts those changes along with formatted data structures into the stack frame for transferral to the system configuration utility 704, as shown in flowchart block 1014 of FIG. 10. After this step, the overlay 702 returns the stack frame to the utility 704 and relinquishes control.

b. Subfunction CHANGE RESULT

The subfunction CHANGE RESULT is called by the utility 704 when the user changes a type selection while viewing the second information panel 500.

If the subfunction CHANGE RESULT is detected at flowchart block 1004, then the flowchart 1200 of FIG. 12 will be entered, starting with flowchart block 1224. Refer above for a discussion of the overlay 702 in relation to flowchart block 1224 and what follows.

c. Subfunction NEW SLOT

A NEW SLOT call is the way in which the system configuration utility 704 informs the overlay 702 that a board has been added or removed. When the overlay 702 reaches the logic as shown in flowchart block 1006, the overlay 702 looks for information in its data structures (block 804 of FIG. 8) sent from the utility 704, relating to where the boards are inserted. The boards are inserted into "slots" which are consecutively numbered in the preferred embodiment.

At flowchart block 1016, the overlay 702 decides if a new board has been added. If a board has been added, then at flowchart block 1018 the board s data structures (block 908 of FIG. 9) previously declared during the INIT call are linked into the link list of all the data structures for all the boards. The board is now deemed to be a part of the system configuration, as denoted by flowchart block 1020. In the event that a new board has not been added, the overlay 702 will remain in operation, but the data structures allocated to the removed board are deallocated in flowchart block 1022. Next, at flowchart block 1024 the board is removed from the link list for all the boards so that it is no longer a part of the system configuration.

After flowchart block 1020 or flowchart block 1024, the overlay 702 inserts any changes that were made during the subfunction NEW SLOT into the stack frame for transferral to the system configuration utility 704, as shown in flowchart block 1014 of FIG. 10. After this step, the overlay 702 returns the stack frame to the utility 704.

d. Subfunction RESET DEFAULTS

When the user wishes to return to a hard disk type which was auto-detected previously by the PC architecture 100, then the utility 704 upon the command of the user will send a function CHANGE call with a subfunction RESET DEFAULTS to the overlay 702.

When the overlay 702 detects that a subfunction RESET DEFAULTS has been sent at flowchart block 1008, it will proceed to flowchart block 1026, where it restores all the auto-detected parameters determined during the INIT call in flowchart block 918 of FIG. 9. As shown, the overlay 702 then moves to flowchart block 1014 discussed in detail above.

e. Subfunction REVERT SAVED

When the user wishes to restore the hard disk type that existed during the time the last system configuration was saved, the utility upon the command of the user will send a function CHANGE call with a subfunction REVERT SAVED to the overlay 702.

When the overlay 702 detects at flowchart block 1010 that a REVERT SAVED call has been initiated by the utility 702, it will move to flowchart block 1028, where the overlay 702 retrieves the disk drive type from the nonvolatile memory 146. As shown, the overlay 702 then moves to flowchart block 1014 discussed in detail above.

3. Function UPDATE

Figure 13:
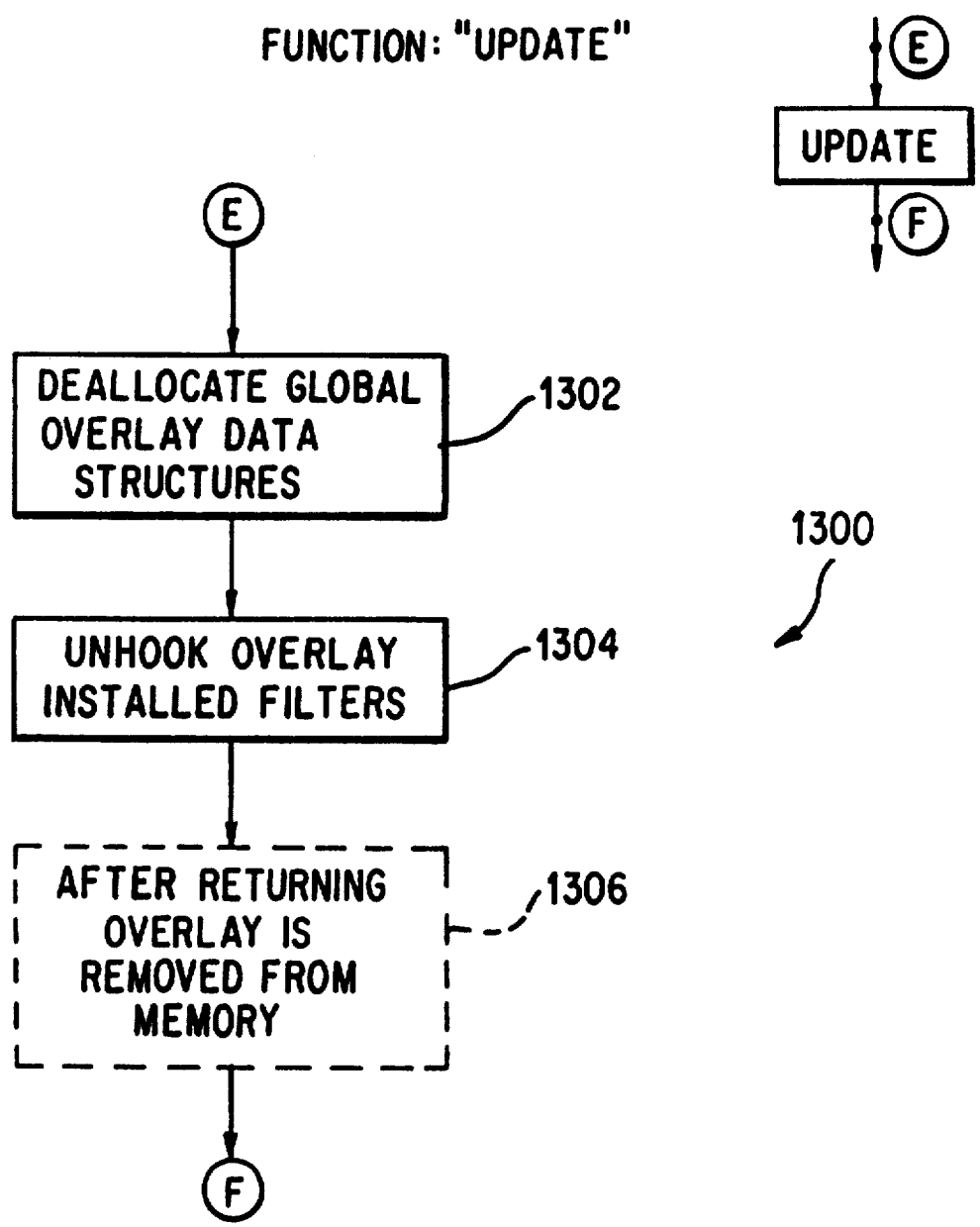
FIG. 13 is a flowchart 1300 which shows at a low level the function UPDATE.

The logic of the function UPDATE is illustrated in flowchart 1300 at FIG. 13. This function is called by the utility 704 to apprise the overlay 702 of any changes to the system configuration saved in the nonvolatile memory 146. An UPDATE call will occur only when a disk drive type is saved.

At flowchart block 1302, the overlay 702 deallocates its global data structures. At flowchart block 1304, the overlay 702 unhooks itself from everything, typically the software interrupt chain. At flowchart block 1306, the overlay 702 returns control over to the system configuration utility 704.

IV. Conclusion

Thus, the system of the present invention provides for auto-detection of mass storage devices, including but not limited to, hard disk drives. It provides for a convenient user interface including a series of user-friendly information panels so that the user can override the auto-detected type by selecting a different type from a list in the BIOS program or so that the user can enter a custom type. Even the uneducated computer user can quickly and correctly configure the PC architecture by selecting the correct mass storage device type.

It should be understood that present invention is not limited to the preferred embodiment as described above, and that the examples presented are merely for the purposes of illustration. The scope of the present invention should therefore be interpreted by the following claims as defined by the foregoing figures and text.

What is claimed is:

1. A system for a personal computer, the system comprising:
   (1) a mass storage device, coupled to the personal computer, having a first configuration initially unknown to the personal computer.
   (2) first means for permanently storing in said personal computer various configurations corresponding to various mass storage devices;
   (3) second means for automatically detecting said first configuration;
   (4) third means for comparing said first configuration with said various configurations;
   (5) fourth means, coupled to said third means, for setting the personal computer to said first configuration if said first configuration matches a second configuration in said various configurations as determined by said third means; and
   (6) fifth means for communicating to a user a type denoting said second configuration.

2. A system of claim 1, wherein said mass storage device is a hard disk.

3. A system of claim 2, further comprising a fourth means for communicating to said user data pertaining to said first configuration, said data relating to said cylinders, heads, precompensation, landing zone, and sectors of said hard disk.

4. A system of claim 1, wherein said first means comprises more than one drive table.

5. A system of claim 1, wherein said first means comprises a drive table in an overlay.

6. A system of claim 1, wherein said first means comprises a translation algorithm in an overlay.

7. A system of claim 1, wherein said various configurations includes more than 47 industry-standard configurations.

8. A system of claim 1, further comprising:
   sixth means, coupled to the personal computer, for allowing a user to either input a third configuration, if said first configuration does not match a second configuration in said various configurations as indicated by said third means, or make a selection of a fourth configuration from said various configurations; and
   seventh means, coupled to said mass storage device, for permitting said personal computer to interact with said mass storage device in accordance with said third configuration or said fourth configuration.

9. A system of claim 1, further comprising a means for communicating to said user the operating parameters of said second configuration.

10. A system of claim 1, wherein said means for communicating comprises a display monitor.

11. A method for aiding a user in configuring user-installed means storage devices in a personal computer, the method comprising the following steps;
   (a) permanently storing in the personal computer various configuration corresponding to various mass storage devices;
   (b) automatically detecting a first configuration of a user-installed mass storage device;
   (c) comparing said first configuration with said various configurations; and
   (d) setting the personal computer to said first configuration if said first configuration matches a second configuration in said various configurations, said setting step performed by the personal computer.

12. A method of claim 11, further comprising the step of communicating to said user a type denoting said second configuration.

13. A method of claim 12, further comprising the step of allowing said user to either input a third configuration or make a selection of a fourth configuration from said various configurations.

14. A method of claim 13, further comprising the step of permitting said personal computer to interact with said mass storage device in accordance with said third configuration or fourth configuration.

* * * * *